United States Patent [19]
Edwards

[11] 3,857,429
[45] Dec. 31, 1974

[54] TIRE AND WHEEL ASSEMBLIES

[75] Inventor: Reginald H. Edwards, Sutton Coldfield, England

[73] Assignee: Dunlop House, London, England

[22] Filed: July 31, 1972

[21] Appl. No.: 276,449

[30] Foreign Application Priority Data
Aug. 21, 1971 Great Britain.................... 39344/71

[52] U.S. Cl. .............................. 152/379, 152/362 R
[51] Int. Cl. ........................ B60c 17/00, B60c 15/00
[58] Field of Search ........... 152/330, 352, 379, 362, 152/353, 396

[56] References Cited
UNITED STATES PATENTS

| | | | |
|---|---|---|---|
| 1,754,836 | 4/1930 | Schenuit | 152/362 R |
| 1,939,935 | 12/1933 | Wagenhorst | 152/362 R |
| 2,868,260 | 1/1959 | Powers et al. | 152/396 |
| 3,302,681 | 2/1967 | Travers | 152/362 R |
| 3,486,547 | 12/1969 | Powers | 152/352 |
| 3,540,510 | 11/1970 | Smithkey, Jr. | 152/353 |
| 3,599,695 | 8/1971 | Knight | 152/352 |
| 3,664,405 | 5/1972 | Poyner | 152/379 |
| 3,708,847 | 1/1973 | Mitchell | 152/379 |

*Primary Examiner*—Drayton E. Hoffman
*Attorney, Agent, or Firm*—Stevens, Davis, Miller & Mosher

[57] ABSTRACT

A pneumatic tire provided with beads each shaped to have heel and toe portions; each toe is provided with a radially inwardly annulus of elastomeric material which restrains the bead against axially inward movement even when the tire is deflated and also improves the fluid seal between bead and wheel rim. The tire may be fitted to a wheel having an annular notch for receiving the annulus on the bead toe.

17 Claims, 15 Drawing Figures

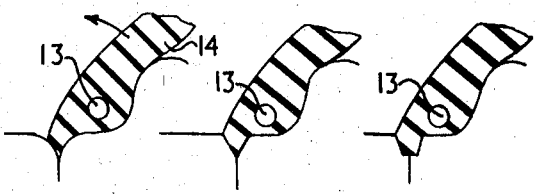
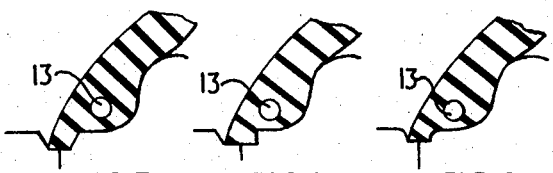
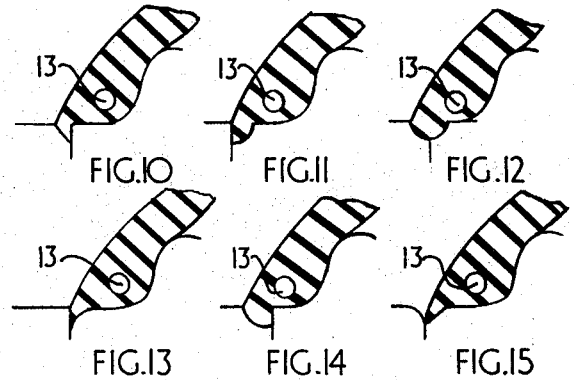

TIRE AND WHEEL ASSEMBLIES

This invention relates to pneumatic tire and wheel assemblies.

In a conventional assembly of a tubeless pneumatic tire on a well-base rim deflation of the tire is likely to result in the beads of the tire becoming displaced from the rim flanges whereupon they move into the well of the rim and directional control over the assembly is lost. This situation is a dangerous one and has been attributed as the cause of many serious accidents.

Bead spacer rings and similar devices have been proposed to deal with this problem. However, they suffer from the disadvantage that assembly is made more complicated by the need to insert these devices into position after at least one of the beads has been seated on the rim.

In U.K. Pat. No. 890,959 a split rim is proposed in which the split is sealed by clamping therein a fabric reinforced rubber covered extension of the tire bead. The assembly of this arrangement is also a complicated operation since the seal of the whole assembly in the normal inflated state depends upon the accurate clamping of the bead extension in the slit. The clamped bead is also restrained from the movements which take place on deflection of the tire during normal running and this will lead to additional stresses in the bead region.

I have found that displacement of a bead from its seat during deflated running of the tire is the result of the rim being forced laterally over the tread on application of sideways force so that the sidewall of the tire on the side to which the rim is being forced exerts a pull on the bead. Clearly this pull exerts a couple about the bead coil rather than being a simple lateral pull. Thus the toe of the bead is forced onto the rim and the heel of the bead is lifted from the rim.

We have found that this rotary movement can be harnessed to restrain lateral movement of the bead without the need for clamping of the bead and without need of any radial projection from the rim inside the bead.

According to the present invention a pneumatic tire and wheel rim assembly comprises a wheel rim in which, adjacent at least one bead seat, there is a circumferential notch and a pneumatic tire comprising a tread, sidewalls and rubber covered beads for seating on the bead seats of the wheel rim. At least the bead on the bead seat adjacent said notch is provided with a heel portion to be adjacent a wheel rim flange and a toe portion which is extended into a radially inwardly directed annulus comprising elastomeric material, the annulus resting freely in said notch and the extended toe and the notch being of cross sectional shape and size which permits said toe to be compressed into said notch upon tilting of the bead under the influence of lateral forces on the tire whereby said bead is restrained from movement axially across the wheel rim.

According to the invention also a pneumatic tire comprises a tread, sidewalls and rubber covered beads for seating on the bead seats of a wheel rim, said tread including a breaker assembly and having a substantially flat profile at least one bead being shaped to have a heel portion to be adjacent a substantially radially extending wheel rim flange and a toe portion which is extended into a radially inwardly directed annulus comprising elastomeric material.

The tire bead having an extended toe portion is thus restrained from moving axially inwardly from its bead seat even when the tire is in a deflated or almost deflated condition and the fluid seal between the bead and the rim in this condition is improved.

The tire is preferably a radial ply tire and may have a steel or textile radial ply carcass together with a breaker assembly of any suitable construction and material. In order to have enhanced performance when it is in a deflated condition the tread of the tire is preferably wider than the width of the wheel rim between flanges, the width of the wheel rim between flanges being considered to be the distance between the axially outermost points of the rim flanges which bear down on the tire when the tire is loaded in the deflated condition, and the tire preferably has an aspect ratio of between 30 and 75 percent and particularly between 55 and 70 percent.

It will be appreciated however that this invention may be used with advantage with tires and rims of conventional dimensions e.g., 80 percent aspect ratios and wider rims relative to the tire tread, and improve safety by eliminating the possibility of the tire beads moving freely into a well.

The extended toe portion and notch are preferably provided on at least the laterally outer bead of the tire wheel assembly, the shape of the annulus of the extended bead toe depending on the size and position of the notch on the rim on which the tire is to be mounted.

Preferably the annulus and the notch each taper radially inwardly so as to provide increasing compression of the annulus into the notch as the bead tilts. The annulus may be directed wholly radially inwardly or alternatively can be directed radially and axially inwardly. The annulus preferably takes a curved form similar in cross-section to a curved beak, the notch being a V-shape, with curved walls e.g., as results from a split or crimp in a rim of pressed sheet steel.

The wheel rim on which the tire is mounted in the tire and wheel rim assembly is preferably narrow relative to the width of the tire tread and is preferably a crimped rim, i.e., a rim in which a well has been axially compressed after the tire has been mounted thereon, or a split rim, the notch in the rim being at the position of the crimp or split in the wheel rim.

It is advantageous for the annulus and notch to have radially inwardly tapering shape and the wheel rim to have no well since in this case if the annulus is displaced axially inwardly from the notch in part of the circumference of the wheel by extreme lateral forces, e.g., 0.8g, on the road contact area of the tire, the annulus rides back into the notch where the lateral force on the tire is decreased outside the road contact area. It will be appreciated that such conditions would normally only be generated in road driving in an emergency situation.

A hump or raised portion may, if desired, be provided laterally inwardly of the notch in the wheel rim in order to enhance the effect of the engagement of the annulus in the notch, but in the preferred form of the invention this is not necessary.

Both beads of the tire may have the extended toe portion forming a rubber annulus in which case the toe portion of the bead not adjacent the notch in the rim mentioned above will be stretched to lie flat along the wheel rim. This will again improve the air seal of the bead against the rim if the tire becomes deflated or almost deflated, and will to some degree assist in keeping the bead in position on its bead seat.

The tire wheel assembly is preferably provided with a liquid lubricant to reduce friction in the tire running in the deflated or substantially under-inflated condition as described in U.S. Pat. No. 3,739,829 issued June 19, 1973. The tire may be provided with an internal coating of lubricant as described in U.S. Pat. No. 3,379,829. Preferably however, the tire and wheel assembly comprises lubricant enclosed in an enclosing means which will release the lubricant when the tire becomes deflated as described in U.S. Pat. No. 3,739,829.

A tire and wheel assembly of this invention will now be described in more detail, by way of example only, with reference to the accompanying drawings in which:

FIGS. 4 to 15 illustrate schematically alternative shapes for the extended bead toe and notch on the wheel rim.

Figure 1:
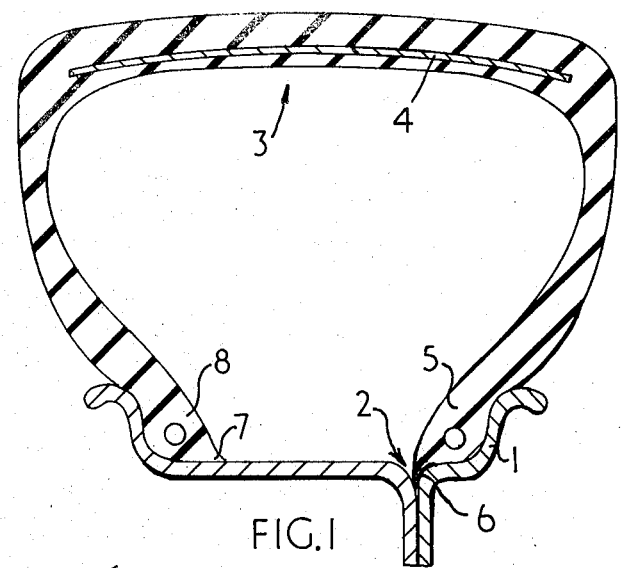
FIG. 1 is a diagrammatic cross-section of a tire on a wheel rim showing a preferred embodiment in which an extended bead toe on the outboard bead engage a suitably shaped and positioned notch in the rim.

As shown in section in FIG. 1 and wheel rim 1 which may be a crimped or split rim has a notch 2 adjacent the laterally outer bead seat on the wheel rim. The tire 3 mounted on the rim has a tread region which is relatively flat in profile and reinforced by a breaker assembly 4. The carcass of the tire is reinforced with cords extending substantially in the radial direction (not shown). The bead 5 seated in the laterally outer bead seat has a radially inwardly directed extension 6 of its toe portion in the form of a rubber annulus of tapering cross-section. The rubber annulus rests in the notch 2 in the wheel rim and this will become compressed into the notch upon application of lateral force on the assembly in an under-inflated or deflated condition and thus restrains the bead 5 from lateral movement relative to the wheel rim. A similar rubber extension 7 is also provided on the toe portion of the laterally inner bead 8, but is stretched over the wheel rim in this case primarily to improve the fluid seal between the bead and the rim when the assembly is deflated or underinflated.

Figure 2:
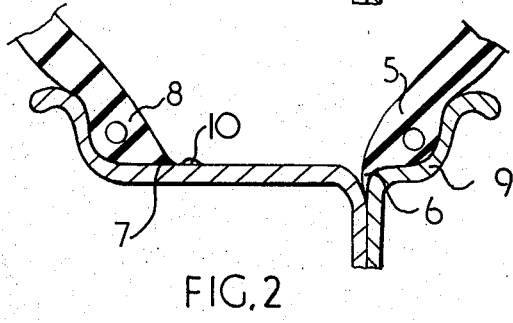
FIG. 2 shows an alternative approach in which a small ridge is provided on the rim adjacent the inboard bead seat.

FIG. 2 shows a similar arrangement to FIG. 1 except that in this case the wheel rim 9 is provided adjacent the laterally inner bead seat with a small hump 10 to be engaged by the bead 8 in the laterally inner bead seat.

The engagement of the bead 8 with the hump 10 restrains movement of the bead away from the rim flange and out of the bead seat, and also assists in conjunction with the extension 7, to improve the seal between the bead 8 and the rim.

Figure 3:
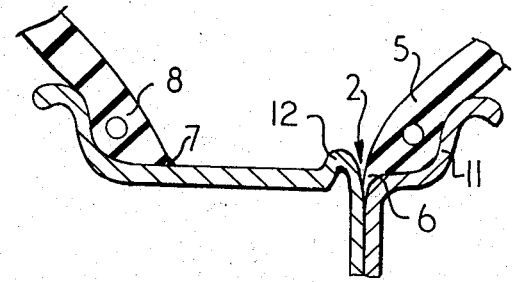
FIG. 3 shows a further alternative in which a hump is provided on the wheel rim adjacent the notch.

FIG. 3 shows an arrangement similar to FIG. 1 except that on the laterally inner side of the notch 2 in the wheel rim 11 there is located a hump 12 to enhance the engagement of the rubber annulus 6 in the notch 2 and thus improve the resistance of the bead to being displaced from the bead seat. In this arrangement also there is no hump on the wheel rim adjacent the laterally inner bead seat, the extension 7 on the laterally inner bead 8 lying flat along the wheel rim.

FIGS. 4 to 15 show schematically various shapes of bead toe extension and notch which could be used, the tilting motion of the bead being produced by movement of the tire lower side wall 14 in the direction of the arrow shown in FIG. 4, under the influence of lateral forces on the tire when the tire is deflated.

In FIGS. 4, 5, 6, 10, 12 and 14 various shaped extensions and notches are shown in which the notch is beneath the toe of the bead. It will be appreciated that the notch may not be moved laterally outwardly beyond the roll center of the bead, otherwise the rubber annulus engaging the notch will not be compressed into it but will be lifted from it by lateral forces. The roll center will be governed largely by the shape and position of the rigid bead coil 13.

Thus the resistance of the bead to the tilting motion induced upon it by lateral forces on the tire as discussed above will also be increased by positioning the bead coil closer to the base of the bead and also by using a bead coil of squat cross section e.g., of strip form.

In practical terms, the notch is conveniently positioned at the split in a split wheel rim, or a crimp in a rim where a well has been closed by axial compression. When the rim is made of sheet steel it is most convenient to produce a notch of the type shown in FIGS. 1, 2, 3, 4 and 9 since in the shaping of the rim it is not readily possible to produce sharply defined corners, the bends in the metal always having some radius of curvature.

Having now described my invention, what I claim is:

1. A pneumatic tire and wheel assembly capable of being run in a deflated condition comprising a wheel rim having a pair of flanges and bead seats and in which, adjacent at least one bead seat, there is a circumferential notch; and a pneumatic tire comprising a tread, sidewalls and rubber covered beads for seating on the bead seats of the wheel rim, at least the bead on the bead seat adjacent said notch having a heel portion adjacent a wheel rim flange and a toe portion extending radially inwardly of the base of the bead, as a radially inwardly directed annulus the distal end of the annulus projecting freely into said notch and the extended toe and the notch being of a cross-sectional shape and size which permits said toe to be compressed into said notch upon tilting of the bead under the influence of lateral forces on the tire whereby said bead is restrained from movement axially across the wheel rim.

2. A pneumatic tyre and wheel rim assembly according to claim 1 in which the tire is a radial ply tire having a steel or textile radial ply carcass together with a breaker assembly.

3. A pneumatic tire and wheel rim assembly according to claim 1 in which the tread of the tire is wider than the width of the wheel rim flanges.

4. A pneumatic tire and wheel assembly according to claim 1 in which the tire has an aspect ratio of between 35 to 75 percent.

5. A pneumatic tire and wheel rim assembly according to claim 1 in which the extended toe portion and notch are provided on at least the axially outer bead of the tire and wheel assembly.

6. A pneumatic tire and wheel rim assembly according to claim 1 in which the annulus of the bead toe extension and the notch each taper radially inwardly.

7. A pneumatic tire and wheel rim assembly according to claim 6 in which the annulus takes a curved tapering form similar in cross section to a curved beak, the notch being a V shape with outwardly curved walls.

8. A pneumatic tire and wheel rim assembly according to claim 1 in which the wheel comprises a crimped rim, the notch in the rim being at the position of the crimp in the rim.

9. A pneumatic tire and wheel rim assembly according to claim 1 in which the wheel rim is a split rim, the notch in the rim being at the position of the split in the rim.

10. A pneuamtic tire and wheel rim assembly according to claim 1 in which both beads of the tire have an extended toe portion forming a rubber annulus, the toe portion of the bead not adjacent the notch in the wheel rim being stretched to lie flat along the wheel rim.

11. A pneumatic tire and wheel rim assembly according to claim 1 in which the pneumatic tire is provided with bead coils of squat cross-section.

12. A pneumatic tire and wheel assembly capable of being run in a deflated condition comprising:
 a. a wheel with a pair of opposed annular flanges and bead seats adjacent said flanges for mounting a tire thereon, a zone of non-decreasing diameter between said bead seats free of any projection radially outwardly from said rim higher than will permit a tire bead to pass over it;
 b. a circumferential notch in said zone, said notch being adjacent to one of said bead seats;
 c. a pneumatic tire having a tread, sidewalls and rubber covered beads for seating on the bead seats with at least the bead on the bead seat adjacent said notch having a heel portion adjacent its flange and a toe portion extending radially inwardly of the base of the bead as a radially inwardly directed annulus with the distal end thereof projecting freely into the notch and the extended toe and the notch being of a cross-sectional shape and size which permits said toe to be compressed into said notch upon tilting of the bead under the influence of lateral forces on the tire whereby said bead is restrained from movement axially across the wheel rim especially when run in a deflated condition.

13. The assembly of claim 12 in which the tire has a radial ply carcass and a breaker assembly.

14. The assembly of claim 12 in which the tread of the tire is wider than the width of the wheel rim flanges.

15. The assembly of claim 12 in which the tire has an aspect ratio of between 35% and 75%.

16. The assembly of claim 12 in which the bead toe extension and the notch each taper radially inwardly.

17. A pneumatic tire and wheel rim assembly capable of being run in a deflated condition comprising:
 a. a wheel rim having a pair of opposed annular flanges and bead seats with a zone of non-decreasing diameter between the bead seats and a circumferential notch adjacent at least one bead seat;
 b. a radial ply pneumatic tire mounted on the rim comprising a tread having a width greater than the width between the rim flanges, sidewalls and rubber covered beads for seating on the bead seats, both beads having a heel portion adjacent a rim flange and a toe portion of substantially elastomeric material tending to extend radially inwardly of the base of the bead as a radially inwardly directed annulus;
 c. the bead toe extension remote from the rim notch being stretched to lie flat along the wheel rim;
 d. the bead toe extension adjacent the rim notch extending radially inwardly of the base of its bead as a radially inwardly directed annulus, the distal end of the toe projecting freely into the notch, the bead toe extension and the notch each tapering radially inwardly with the toe and the notch being of a cross-sectional shape and size to permit the toe to be compressed into the notch upon tilting of the bead under the influence of lateral forces on the tire whereby the bead is restrained from movement axially across the wheel rim.

* * * * *

UNITED STATES PATENT OFFICE
CERTIFICATE OF CORRECTION

Patent No. 3,857,429         Dated December 31, 1974

Inventor(s) Reginald H. EDWARDS

It is certified that error appears in the above-identified patent and that said Letters Patent are hereby corrected as shown below:

In the heading, line 73, change "House" to --Limited--.

In column 3, line 26, change "and" to --a--.

Signed and sealed this 27th day of May 1975.

(SEAL)
Attest:

RUTH C. MASON
Attesting Officer

C. MARSHALL DANN
Commissioner of Patents
and Trademarks